US 6,691,245 B1

(12) United States Patent
DeKoning

(10) Patent No.: US 6,691,245 B1
(45) Date of Patent: Feb. 10, 2004

(54) DATA STORAGE WITH HOST-INITIATED SYNCHRONIZATION AND FAIL-OVER OF REMOTE MIRROR

(75) Inventor: Rodney A. DeKoning, Augusta, KS (US)

(73) Assignee: LSI Logic Corporation, Milpitas, CA (US)

( * ) Notice: Subject to any disclaimer, the term of this patent is extended or adjusted under 35 U.S.C. 154(b) by 486 days.

(21) Appl. No.: 09/685,498

(22) Filed: Oct. 10, 2000

(51) Int. Cl.[7] .............................................. G06F 11/00
(52) U.S. Cl. ............................................ 714/6; 714/15
(58) Field of Search ................................ 714/6, 15, 20, 714/21

(56) References Cited

U.S. PATENT DOCUMENTS 5,835,953 A * 11/1998 Ohran ......................... 711/162
5,951,695 A * 9/1999 Kolovson ..................... 714/16
6,324,654 B1 * 11/2001 Wahl et al. ..................... 714/6
6,463,501 B1 * 10/2002 Kern et al. .................. 711/100
6,539,462 B1 * 3/2003 Martinage et al. .......... 711/162
6,564,336 B1 * 5/2003 Majkowski ..................... 714/4

* cited by examiner

Primary Examiner—Nadeem Iqbal
Assistant Examiner—Timothy M. Bonura
(74) Attorney, Agent, or Firm—Suiter West PC LLO

(57) ABSTRACT

A mirrored data storage system utilizes a first host device and a local storage device for primary data storage and a second host device and a remote storage device for mirrored, fail-over storage on behalf of client devices. At periodic intervals (called checkpoints), the first host device initiates data synchronization between itself and the two storage devices and issues checkpoint information to ensure that each device maintains information for a common stable storage state. The local storage device synchronizes its stored data and forwards the checkpoint information to the remote storage device. The remote storage device maintains a copy (called a snapshot) of the data at the common stable storage state. Given the snapshot and the checkpoint information, the remote storage device can restore itself to the common stable storage state in the event of a failure of the first host device and/or the local storage device. Upon failure of the first host device and/or the local storage device, the second host device is instructed to initiate a switch, or fail-over, to serving as the primary data storage on behalf of the client devices.

24 Claims, 4 Drawing Sheets

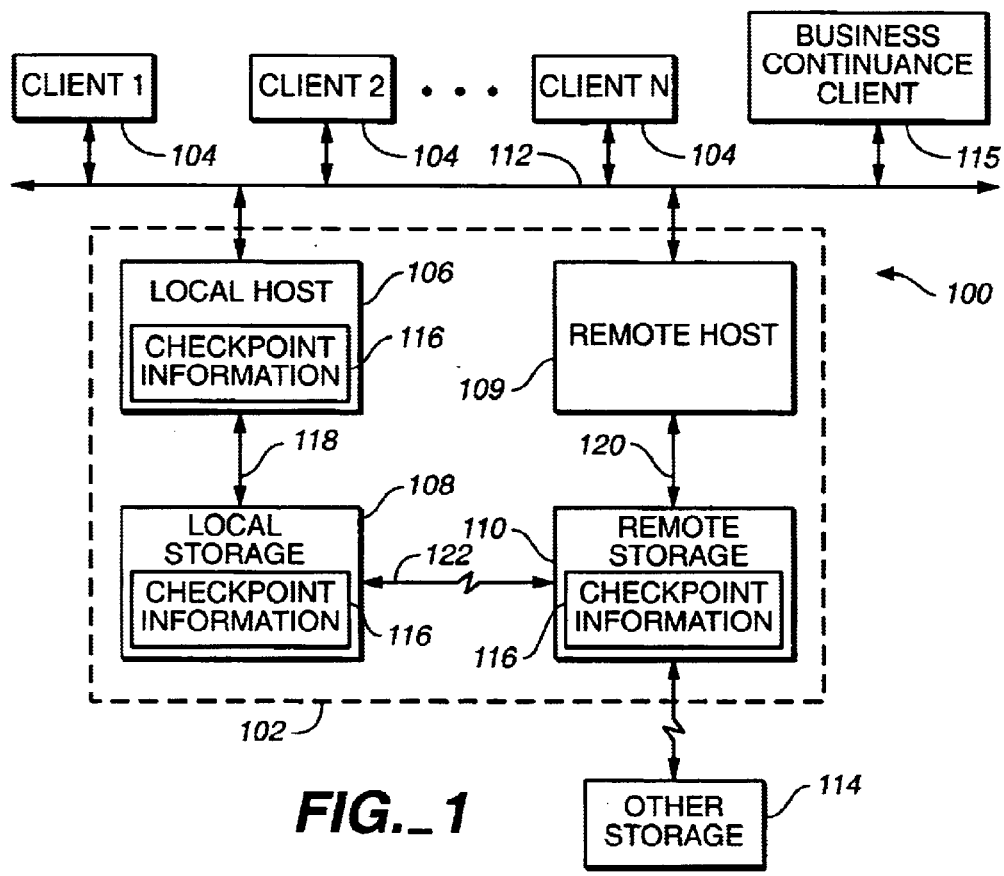
FIG._1
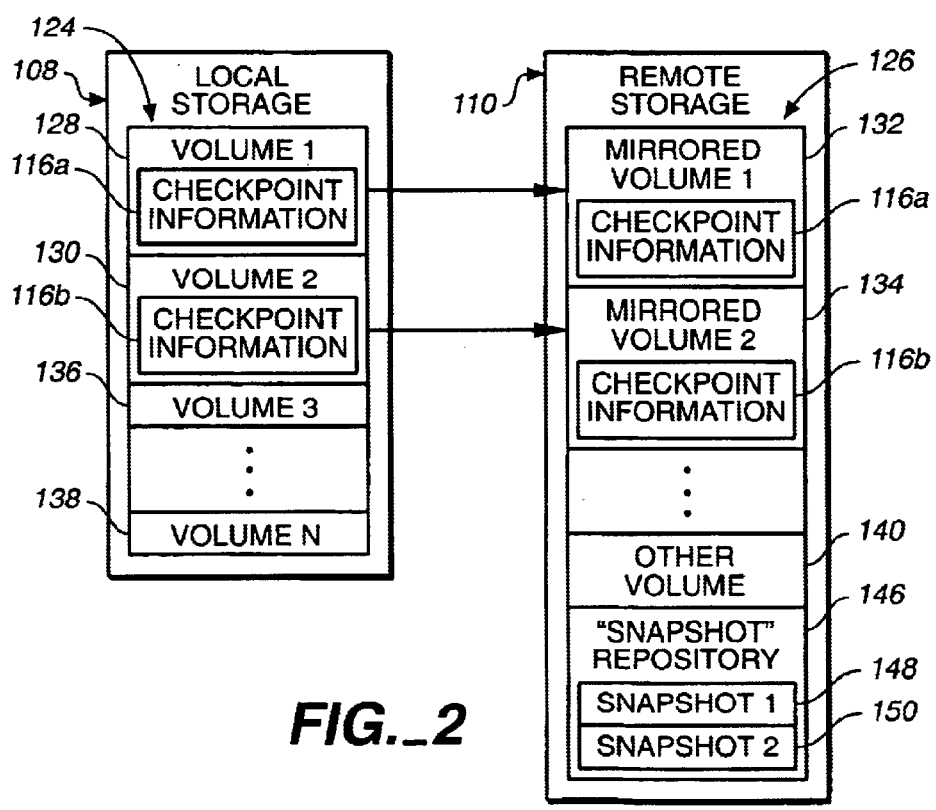
FIG._2

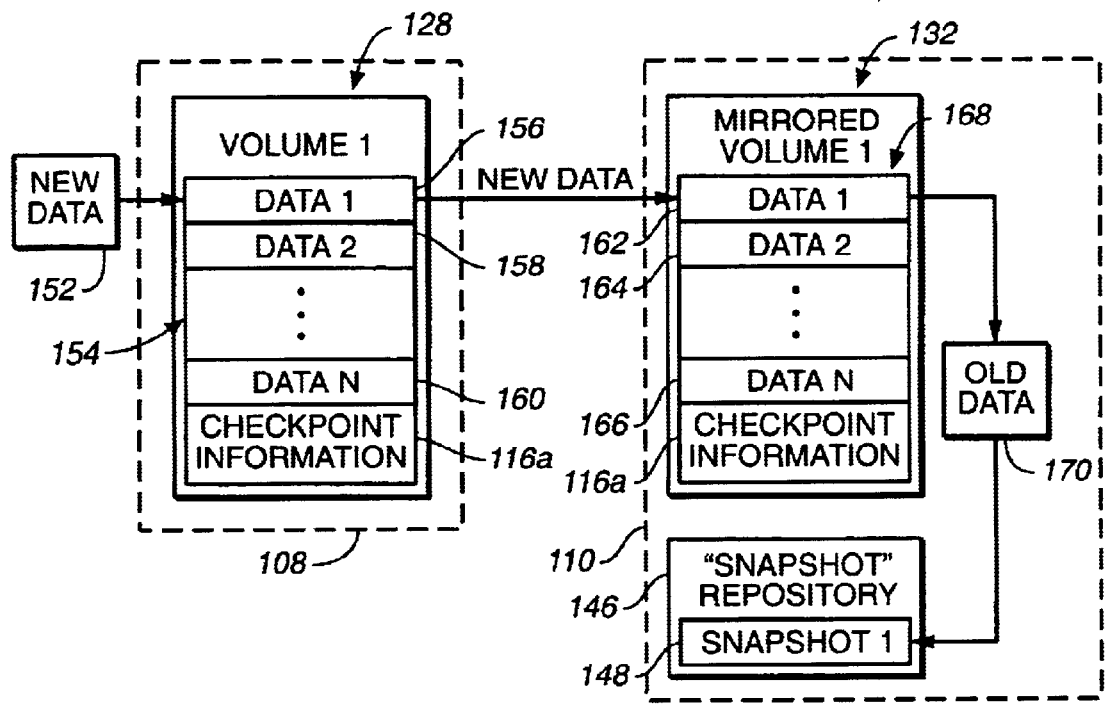
FIG._3
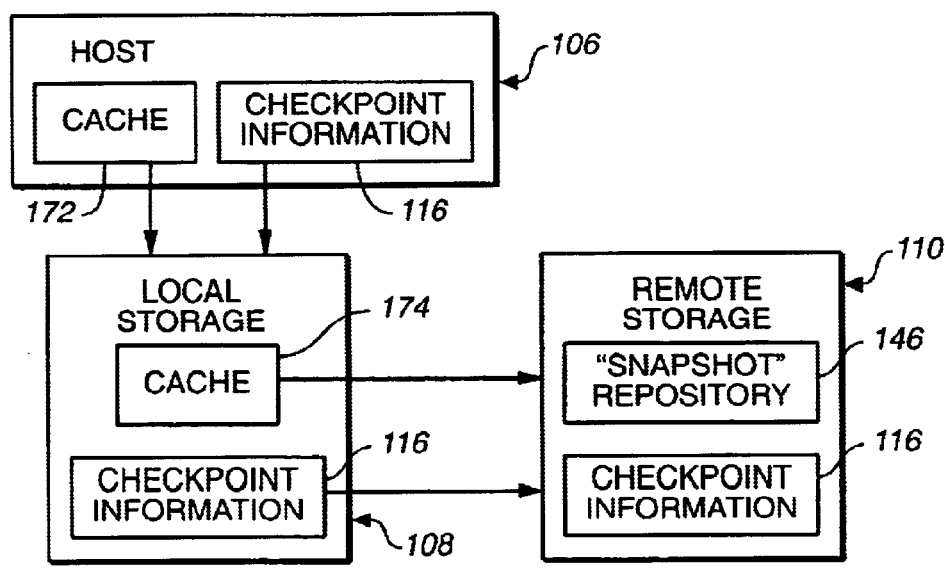
FIG._4

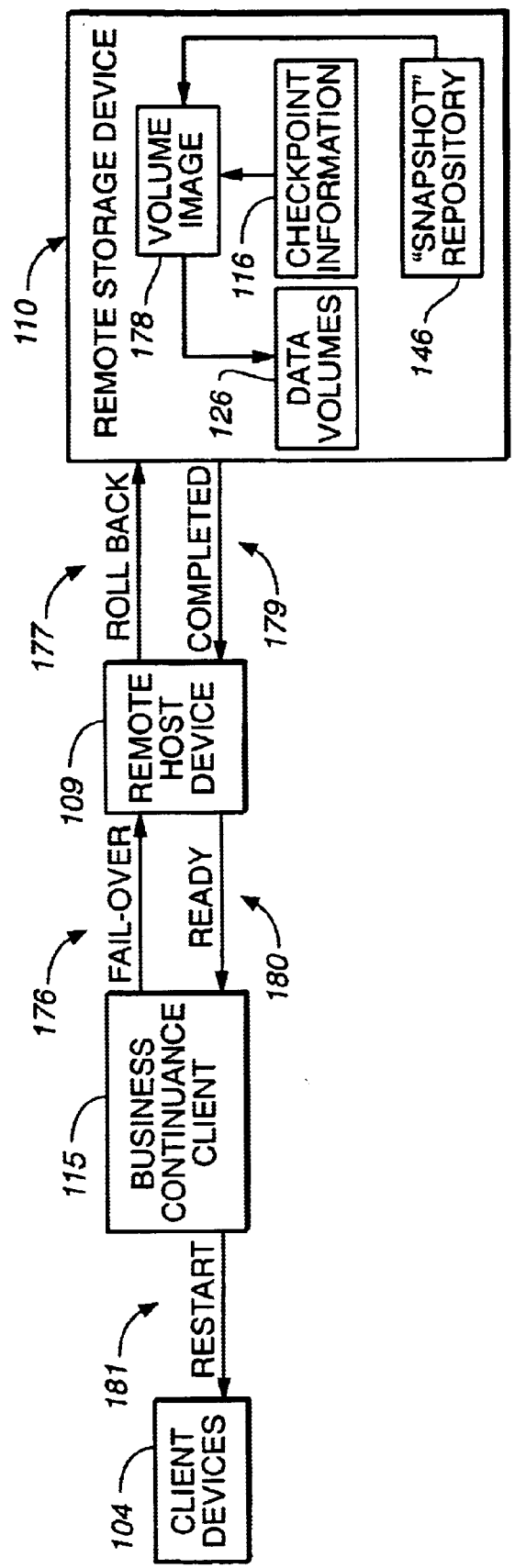
FIG._5

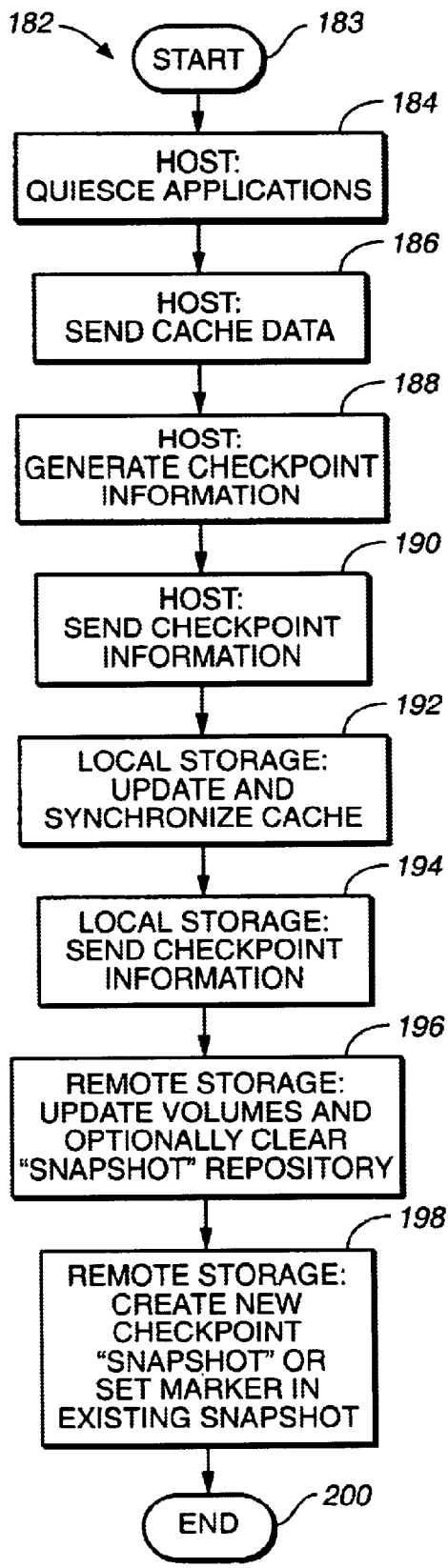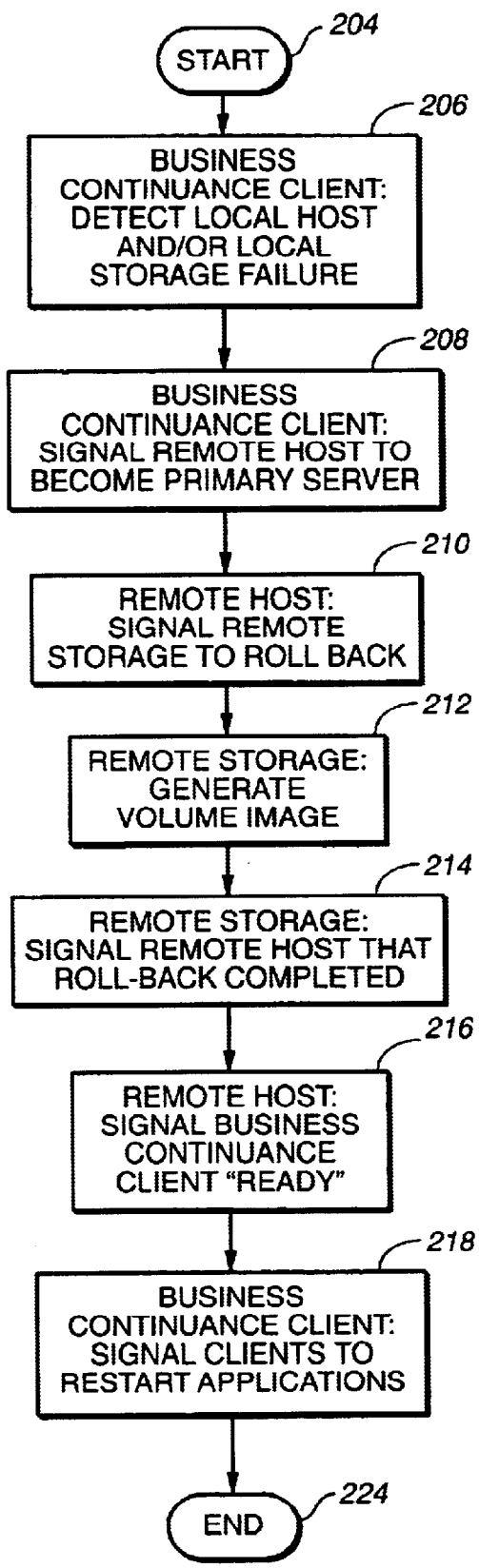
FIG._6        FIG._7

DATA STORAGE WITH HOST-INITIATED SYNCHRONIZATION AND FAIL-OVER OF REMOTE MIRROR

FIELD OF THE INVENTION

This invention relates to data storage in a computerized network or system. More particularly, the present invention relates to a new and improved technique of host-initiated synchronization of data that is stored on both a local storage device and a remote mirroring fail-over storage device. The data stored by the host on the local storage device is mirrored to the remote storage device, and a synchronization procedure enables the host and remote storage device easily and quickly to "roll back" to, and continue operations from, a stable, coherent state in the event of a failure of the local storage device.

BACKGROUND OF THE INVENTION

Computerized systems are commonly used to operate various businesses or enterprises. In many cases, the data that is kept on the computers and data storage devices is critical to the functioning of the enterprise. A temporary inability to access this data can halt business operations, and a total loss or corruption of the data can severely cripple the entire enterprise. Therefore, it is important to such enterprises to maintain availability and validity of the data.

One technique to ensure data availability and validity is to store the data in more than one storage device, such as in primary and secondary storage devices. In this case, the secondary storage device maintains a "mirrored," or duplicate, copy of the data. In the event of a failure of the primary storage device, operations can resume using the secondary storage device and the mirrored data.

Additionally, the secondary storage device is typically maintained at a geographically remote location from the primary storage device, such as at a different city or state, while the primary storage device is kept locally. In this manner, a geographical disturbance, such as a local citywide power outage, will not affect both storage devices, and operations can eventually resume.

Also, the local and remote storage devices are typically accessed by host devices, or storage servers, that serve the data storage requirements of various client devices. At least one such host device is maintained at the local site and another at the remote location to access the local and remote storage devices, respectively. Therefore, when the local storage device fails, the remote host device, using the remote storage device, takes over serving the data storage requirements of the various clients.

Various methods have been developed to mirror, or duplicate, the data from the primary storage device at the local site to the alternate, secondary storage device at the remote site. Such remote mirroring solutions ensure the continuance of business in the event of a geographical disaster. Many of these solutions, however, have either performance or coherency synchronization issues. Performance issues require that very little time be taken to perform a "fail-over" to, or switch to, the remote storage and host devices, so as not to degrade the overall performance of the clients using the backed-up data. Coherency synchronization requires that the state of the stored data between the local and remote storage devices, be put in a "coherent state" at which it is assured that both have correct, up-to-date data that may be used by a file system or database. In the event of a fail-over situation, the synchronization difficulties of current mirroring techniques can result in time-consuming special efforts to generate a coherent state in the remote storage device through file system check and recovery procedures, so that applications executing on the various clients can proceed to operate.

It is with respect to these and other background considerations that the present invention has evolved.

SUMMARY OF THE INVENTION

The present invention enables efficient remote data mirroring and "fail-over" capabilities in a computer system wherein a local host device stores data on a local storage device on behalf of various client devices, and mirrors the data storage on a remote storage device. "Fail-over" refers to a situation in which the local storage device can no longer service data access requests, so the client devices must switch to using remote storage device with a remote host device for data backup processing. The local host device periodically initiates data synchronization procedures for the local and remote storage devices. Information regarding the latest synchronization procedures is maintained within the local host, local storage and remote storage devices. The synchronization information defines a common, known, coherent state of stored data for all of these devices. The time at which a data synchronization occurs is called a "checkpoint," and the condition of the stored data at which the coherent state is defined is called the "checkpoint state."

The remote storage device maintains a "snapshot" of the data at the latest checkpoint state. The snapshot is essentially a copy of a portion of the data as the data existed at the last checkpoint state. Changes to the stored data on the remote storage device are accepted after each previously occurring checkpoint, but the data that was present at the last checkpoint is transferred to and preserved in the snapshot, so it can be restored at a later time if necessary.

Since the remote storage device maintains information describing the checkpoint state, in the event of a fail-over condition, the remote host device quickly and easily "rolls back" the state of the data stored on the remote storage device to the last common checkpoint state. The data is restored from the snapshot. Applications executing on the client devices, thus, restart at the restored checkpoint state with a minimum of interruption.

These and other improvements are achieved by storing and synchronizing data between a host device, a primary storage device and a secondary storage device. The host device stores data on the primary storage device on behalf of client devices. The data stored on the primary storage device is mirrored to the secondary storage device. Data synchronization between the host device and the primary storage device is initiated by the host device. A checkpoint message is issued from the host device to the primary storage device. The checkpoint message indicates that a storage state of the host device is at a stable consistent state. Data synchronization between the primary and secondary storage devices is performed by the primary storage device. The checkpoint message is then forwarded from the primary storage device to the secondary storage device. An incremental snapshot of the mirrored data is generated on the secondary storage device at the predetermined checkpoint indicated by the checkpoint message. The incremental snapshot includes data and information describing the mirrored data at the predetermined checkpoint to preserve a storage state of the secondary storage device at the predetermined checkpoint.

It is preferable that data be sent from the host device to the primary storage device and forwarded to the secondary storage device, so both the primary and secondary storage devices can update their storage state to be consistent with the host device. It is further preferable, when new data is sent from the host device to the primary storage device and then to the secondary storage device after the predetermined checkpoint, that the secondary storage device transfer any preexisting data, if it is replaced by the new data, to the incremental snapshot. Thus, the incremental snapshot maintains the storage state of the secondary storage device at the predetermined checkpoint.

It is also preferable that these steps be performed in conjunction with failing-over from utilization of the first host device and the primary storage device to utilization of a second host device and the secondary storage device. In such a fail-over situation, a failure of the first host device and/or the primary storage device is detected, and the second host device and the secondary storage device are signaled that they are to be utilized for primary data storage. An image of the data stored on the secondary storage device is assembled from the most recent incremental snapshot, and the second host device is informed when the image is complete, so the second host device and secondary storage device are ready to serve as primary data storage.

The previously mentioned and other improvements are also achieved by switching a client device from utilizing a first host device and a primary storage device to utilizing a second host device and a secondary (mirrored) storage device for primary data storage, upon failure of the first host device and/or the primary storage device. The failure of the first host device and/or the primary storage device is detected. The second host device is signaled that it is to be used for primary data storage. The secondary storage device is signaled to restore the mirrored data stored thereon to a preexisting common stable state that was established at a data synchronization checkpoint at which data was synchronized between the first host device, the primary storage device and the secondary storage device. An image of the mirrored data at the preexisting common stable state is assembled. The host device is signaled that the data image is complete, so the second host device and the secondary storage device are ready to serve as primary data storage for the client device.

The secondary storage device preferably includes a data volume storage area and an old-data storage area. The old-data storage area preferably stores preexisting data that was stored in the data volume storage area at the preexisting common stable state, but that was replaced in the data volume storage area by new data. In this case, it is preferable that the data image is assembled from the preexisting data and checkpoint synchronization information issued by the first host device. It is further preferable to restore the secondary storage device to the preexisting common stable state by returning the preexisting data to the data volume storage area.

The previously mentioned and other improvements are also achieved in a mirrored storage computer system for servicing data storage requirements of software applications executing on client devices. The mirrored storage computer system comprises a host device, a primary storage device, and a secondary storage device. The host device services the software applications requiring data storage, stores data externally, issues external storage access requests, and initiates periodic external data synchronization at stable storage states. The data synchronizations at stable storage states are referred to as data synchronization checkpoints, wherein data stored on the host device is made coherent with externally stored data with respect to a file system synchronization point. The primary storage device is connected to the host device to serve as the external data storage, stores data received from the host device responds to the storage access requests from the host device, makes the data stored in the primary storage device coherent with the data stored on the host device at the data synchronization checkpoints and forwards the data and the data synchronization checkpoints to the secondary storage device. The secondary storage device is connected to the primary storage device for secondary (mirrored) external data storage, receives the data and the data synchronization checkpoints, stores the data, makes the data stored in the secondary storage device coherent with the data stored on the host device and the primary storage device at the data synchronization checkpoints and generates a snapshot of the stored data upon receiving the data synchronization checkpoints. The snapshot represents the stable storage state in the secondary storage device at the data synchronization checkpoint.

The mirrored storage system preferably further comprises a second host device. The second host device is preferably connected to the secondary storage device, takes over servicing the software applications requiring the data storage, and externally stores data on the secondary storage device by issuing external data access requests to the secondary storage device. Preferably, the second host device takes over the servicing of the software applications upon failure of the first host device and/or the primary data storage device by utilizing the data stored on the secondary storage device. The secondary storage device also preferably stores the data received from the second host device and responds to the storage access requests from the second host device. The second host device preferably sends a restore signal to the secondary storage device instructing the secondary storage device to restore the data stored thereon to the stable storage state upon the failure of the first host device and/or the primary storage device. Upon receipt of the restore signal, the secondary storage device preferably restores its data to the stable storage state from the data synchronization checkpoint and the snapshot.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of a computer system with a mirrored storage system incorporating the present invention.

FIG. 2 is an expanded block diagram of, and data flow diagram between, a local storage device and a remote storage device of the mirrored storage system shown in FIG. 1.

FIG. 3 is an expanded diagram of a volume and a mirrored volume of the local and remote storage devices shown in FIG. 2, also illustrating data flow between and within the volumes and mirrored volumes.

FIG. 4 is a diagram of the flow of data within the mirrored storage system shown in FIG. 1 during execution of a checkpoint procedure.

FIG. 5 is a diagram of the flow of data within the mirrored storage system shown in FIG. 1 during execution of a fail-over procedure.

FIG. 6 is a flow chart for the checkpointing procedure shown in FIG. 4 performed by the mirrored storage system shown in FIG. 1.

FIG. 7 is a flow chart for the fail-over procedure shown in FIG. 5 performed by the mirrored storage system shown in FIG. 1.

DETAILED DESCRIPTION

A computerized network 100 incorporating the present invention includes a mirrored storage system 102, as shown in FIG. 1. The computerized network 100 is typically part of an overall enterprise or business (not shown) and is typically used to carry on enterprise-wide operations for the business. The mirrored storage system 102 stores data and software application programs for use by various client devices 104. The client devices 104 include a variety of conventional computerized devices and data processing machines, such as conventional personal computers (PCs), conventional mainframe computers, etc.

The mirrored storage system 102 preferably includes a local host device 106, a local storage device 108, a remote host device 109 and a remote storage device 110. The mirrored storage system 102 typically services the client devices 104 through the local host device 106 with database management, enterprise management or other enterprise-wide services. The local host device 106 utilizes the local storage device 108 to service the storage, database or other access requests of the various client devices 104. The local host device 106 is typically connected to the client devices 104 by a conventional communication system 112, such as a LAN, WAN or dedicated communication channel. Additionally, the remote storage device 110 may optionally be connected to other storage devices 114 to be part of other storage systems (not shown), including other mirrored storage systems.

To ensure continuity of enterprise operations, the client devices 104 utilize the remote host device 109 and the remote storage device 110 as a fail-over storage system in the event of a failure of the local storage device 108 and/or the local host device 106. Such a failure may occur due to a power failure, a flood, an earthquake, etc. In such a fail-over situation, one of the client devices 104, serving as a business continuance client 115, instructs the remote host device 109 to take over serving the storage requirements of the client devices 104. Alternatively, the remote host device 109 serves as the business continuance client and issues periodic queries to the local host device 106 to determine whether to take over serving the storage requirements of the client devices 104. The remote host device 109 signals the remote storage device 110 to "roll back" (i.e. restore) the state of the affected stored data to a known coherent state. The remote host device 109 then opens the necessary files, or logical data volumes, on the remote storage device 110. The business continuance client 115 then instructs the client devices 104 to switch to using the remote host device 109 and the remote storage device 110 for primary data storage. Software programs (not shown) executing on the client devices 104 then restart enterprise operations at the known coherent state with little interruption.

To ensure quick and reliable fail-over to the remote host device 109 and remote storage device 110, the local host device 106 periodically initiates a "checkpoint," a procedure described more completely below, to synchronize data stored throughout the mirrored storage system 102. The host-initiated data synchronization checkpoint ensures that the remote storage device 110 maintains a known, coherent state for the data stored thereon. The known, coherent state is referred to herein as the "checkpoint state." In the event of a fail-over situation (failure of the local storage device 108 and/or the local host device 106), the remote storage device 110 can quickly roll back to the state or form that existed at the most recent checkpoint state. Checkpoint information 116, describing the latest checkpoint state, is passed in a message from host device 106 to local storage device 108 to remote storage device 110 and is maintained in each device 106, 108 and 110. Optionally, the local storage device 108 can delete the older checkpoint information 116 after passing the checkpoint information 116 to the remote storage device 110, since the local storage device 108 doesn't actually use the information.

The checkpoint information 116 describes the known coherent state of the data or file system. Thus, the checkpoint information 116 references all prior I/O (Input/Output) operations, so that the remote storage device 110 knows exactly which data was coherent at the time of the checkpoint. Succeeding I/O's are treated with a conventional copy-on-write procedure, so that a copy of the data at the time of the checkpoint is maintained. Optionally, the checkpoint information 116 includes the time of the checkpoint from the perspective of the local host device 106.

The host devices 106 and 109 are preferably conventional computers or servers. The local storage device 108 and the remote storage device 110 are preferably conventional computers, storage servers or storage array devices, all of which contain data storage devices. The local host device 106 connects to the local storage device 108 through a conventional signal communication path 118. Likewise, the remote host device 109 connects to the remote storage device 110 through another conventional signal communication path 120. The signal communication paths 118 and 120 are preferably dedicated cables, local area networks (LANs) or storage area networks (SANs), such as "Fiber Channel." Additionally, the local host device 106 and the local storage device 108 are typically geographically located relatively closely together, such as within the same building or campus. Likewise, the remote host device 109 and the remote storage device 110 are typically geographically located relatively close to each other, but are relatively remote from the local host and storage devices 106 and 108, such as in a different city, state or country.

The local storage device 108 connects to the remote storage device 110 across another conventional signal communication path 122, such as a dedicated conventional phone line or wide area network (WAN). Due to the remote location of the remote storage device 110, a disturbance or disaster that disrupts or causes the failure of the local storage device 108 and/or the local host device 106, such as a citywide power failure or severe act-of-nature, will not likely also affect the remote storage device 110 and remote host device 109. Thus, the remote host and storage devices 109 and 110 will continue to be available, the mirrored storage system 102 can quickly fail-over to the remote storage device 110, and enterprise operations can soon resume. In this manner, the availability and integrity of the stored data is maintained for the mirrored storage system 102 as a whole.

The general relationship between the local and remote storage devices 108 and 110 and data volumes 124 and 126 stored thereon is shown in FIG. 2. There may be any number of conventional data volumes 124 and 126 stored on the local and remote storage devices 108 and 110, respectively. The data volumes 124 are typically accessed by the local host device 106 (FIG. 1) according to access requests from the client devices 104 (FIG. 1). After failure of the local host and/or storage device 106 or 108 (FIG. 1), the data volumes 126 are typically accessed by the remote host device 109 according to the access requests from the client devices 104. Some of the volumes 124 and 126 may be mirrored (e.g. volumes 128 and 132, 133 and 134) between the local and remote storage devices 108 and 110, and some other volumes (volumes 136, 138 and 140) may not be mirrored.

In the example shown in FIG. 2, local volume 128 in the local storage device 108 is mirrored to mirrored volume 132 in the remote storage device 110, and local volume 130 in the local storage device 108 is mirrored to mirrored volume 134 in the remote storage device 110. The host device 106 (FIG. 1) also maintains copies (not shown) of the data volumes. For those volumes 128, 130, 132 and 134 that are mirrored between the two storage devices 108 and 110, volume-specific checkpoint information 116a and 116b is established. In the example shown, checkpoint information 116a is maintained with and correlated to the local volume 128 and its mirrored volume 132, and checkpoint information 116b is maintained with and correlated to the local volume 130 and its mirrored volume 134. As mentioned above, the local storage device 108 optionally deletes its copy of the checkpoint information 116a and 116b.

The remote storage device 110 also includes a "snapshot" repository 146. The snapshot repository 146 is a portion of the overall memory space in the remote storage device 110 that is reserved for incremental "snapshots" 148 and 150 of the mirrored volumes 132 and 134, respectively. The snapshots 148 and 150 are defined by the state of the mirrored volumes 132 and 134 according to latest checkpoint information 116a and 116b, respectively. Thus, the "snapshots" 148 and 150 of the mirrored volumes 132 and 134, respectively, generally contain data and information related to the mirrored volumes 132 and 134 from which the mirrored storage system 102 can reconstruct the state of the mirrored volumes 132 and 134 at the time when the checkpoint information 116a and 116b was last updated. For example, the snapshots 148 and 150 preferably contain a copy of preexisting data from the mirrored volumes 132 and 134 that has been replaced by new, or changed data, from the local volumes 128 and 130, respectively.

Optionally, the snapshots 148 and 150 comprise a "rolling" repository of the preexisting data from the mirrored volumes 132 and 134, so that multiple checkpoints are maintained with "markers" set in the snapshots 148 and 150 that indicate each of the checkpoints. A marker is a label or demarcation (not shown) in a log (not shown) of the snapshots 148 and 150 that indicates where one checkpoint ends and another begins. In this manner, the remote storage device 110 can roll back to any marker, or checkpoint, depending on the point at which data is considered to be more "valid."

In the event of a failure of the local host and/or storage device 106 and/or 108, using the checkpoint information 116, 116a and 116b and the snapshots 148 and 150, the remote storage device 110 can quickly be restored to a coherent state. Then operations on the client devices 104 can soon resume using the remote host device 109.

Typically, the remote storage device 110 is initially fully mirrored from the local storage device 108 before operations can start using the local host device 106. Access to the local storage device 108 by the local host device 106 is granted only after the initial mirroring of existing data between the local and remote storage devices 108 and 110. Subsequently, all "write" procedures to the local storage device 108 by the local host device 106 lead to synchronization updates to the remote storage device 110. In other words, all new written data is forwarded to the remote storage device 110 for mirrored storage updating. Alternatively, synchronization updates between the local and remote storage devices 108 and 110 occur at predetermined periodic intervals. When the new data replaces data that was present in the remote storage device 110 at the last synchronization, or checkpoint, then the preexisting replaced data is transferred to the snapshot repository 146. By transferring the preexisting replaced data to the snapshot repository 146, the preexisting data is maintained and can be restored later if a fail-over condition occurs and the remote host device 109 has to instruct the remote storage device 110 to roll back to the last checkpoint state.

Upon performing a synchronization update procedure between the local and remote storage devices 108 and 110, new data 152 from the host device 106 that is stored in local volume 128 is mirrored in mirrored volume 132, as shown in FIG. 3.

The new data 152 adds, deletes or modifies data 154 that is stored in local volume 128. The local volume 128 includes several blocks, 158 and 160 of the data 154. In the example shown, the new data 152 changes data block 156. The mirrored volume 132 includes blocks 162, 164 and 166 of data 168 that correspond to the data blocks 156, 158 and 160, respectively, in the local volume 128. Thus, when the mirrored storage system 102 performs a data synchronization procedure to update and synchronize the data volumes 126 (FIG. 2) stored in the remote storage device 110 with the data volumes 124 (FIG. 2) stored in the local storage device 108, the new data 152 is transferred to data block 162, which duplicates data stored in data block 156, in the mirrored volume 132. Changes to the data 168 in the remote storage device 110 are performed with conventional "copy-on-write" snapshot techniques. Copy-on-write snapshot techniques track the updates to the mirrored volume 132. In a copy-on-write technique, the preexisting data 170, that was present in the data block 162 at the time of the last checkpoint, is transferred to the corresponding snapshot 148 in the snapshot repository 146. The remote storage device 110 also maintains the checkpoint information 116a associated with the mirrored volume 132. With the checkpoint information 116a and the snapshot 148, the remote storage device 110 can reconstruct and restore the state of the mirrored volume 132 at the point indicated by the checkpoint information 116a.

When the mirrored storage system 102 (FIG. 1) performs a checkpoint procedure, data flows between the local host device 106, the local storage device 108 and the remote storage device 110 as shown in FIG. 4. The checkpoint procedure is periodically initiated by the local host device 106, typically upon each "data cache flush" procedure, in which the data stored in a cache memory 172 in the local host device 106 is sent to the local storage device 108. Once the local host's cache memory 172 has been "flushed" to the local storage device 108, the local host 106 generates and stores the checkpoint information 116 and sends the checkpoint information 116 in a message to the local storage device 108. The local storage device 108 then synchronizes all new data with the remote storage device 110, typically by sending the unwritten data in its cache memory 174 to the remote storage device 110. The local storage device 108 then forwards the checkpoint information 116 in the message to the remote storage device 110. The checkpoint information 116 notifies the remote storage device 110 of the new checkpoint. When the remote storage device 110 receives the checkpoint information 116, it clears or deletes the old data from the snapshot repository 146 related to the affected data volumes 126 (FIG. 2) and begins a new snapshot 148 or 150 (FIGS. 2 and 3) for the corresponding data volumes 126. Additionally, previous checkpoint information 116 is preferably deleted to free up storage space, although the checkpoint information 116 for some small number of past checkpoints (e.g. most recent three checkpoints) may be maintained. Alternatively, the remote storage device 110 does not clear old snapshot data or checkpoint information, but maintains complete data and information for multiple checkpoints as storage space in the repository allows.

In a "fail-over" procedure, the client devices 104 (FIG. 1) switch from using the local host and storage devices 106 and 108 (FIG. 1) to using the remote host and storage devices 109 and 110 (FIG. 1) for primary data storage. Upon performing a fail-over procedure, data and information is exchanged between the business continuance client 115 (FIG. 1), the other client devices 104, the remote host device 109 and the remote storage device 110 according to the exemplary data flow chart shown in FIG. 5. The business continuance client 115 detects a failure condition in the local host and/or storage devices 106 and/or 108, such as a failure by the local storage device 108 to respond to access requests. The business continuance client 115 sends a fail-over signal 176 to the remote host device 109 instructing the remote host device 109 to take over servicing data access request for the affected data volumes 126. The remote host device 109 then sends a roll-back signal 177 to the remote storage device 110 instructing the remote storage device 110 to begin to roll back the state of the affected data volumes 126 to the state of the last or selected checkpoint, so the remote storage device 110 can become the primary storage device for the data stored in the mirrored volumes 132 and 134 (FIG. 2).

From the snapshot data stored in the snapshot repository 146 and the checkpoint information 116, the remote storage device 110 assembles an "image" 178 of the affected data volume(s) 126 (FIG. 2) that is consistent with the state of the stored data indicated by the last checkpoint information 116 for the affected volumes 126. Generally, the volume image 178 contains the data of the affected volumes 126 at the time of the last checkpoint. The remote storage device 110 replaces the data in the affected data volumes 126 with the volume image 178 and sends a signal 179 to the remote host device 109 indicating that the remote storage device 110 has completed the procedure to restore the data in the affected data volumes 126 to the desired checkpoint state. Alternatively, although the signal 179 indicates that the restore procedure has completed, the remote storage device 110 sends the signal 179 before completing the restore procedure, but completes the restore procedure afterwards in the "background." In this manner, the remote host device 109 can proceed with the next steps while the remote storage device 110 completes the restore procedure. In other words, the signal 179 indicates that the desired data is "useable," rather than that the restore procedure has completed. After receiving the signal 179, the remote host device 109 sends a signal 180 to the business continuance client 115 indicating that the remote host and storage devices 109 and 110 are ready to begin servicing the client devices 104. The business continuance client 115 sends a signal 181 to the client devices 104 instructing them to restart their affected applications using the remote host and storage devices 109 and 110 and the updated data volumes 126 for the primary storage for the applications.

An exemplary checkpoint procedure 182 for periodically synchronizing stored data throughout the mirrored storage system 102 (FIG. 1) and generating a common checkpoint state for the local host device 106 (FIG. 1), the local storage device 108 (FIG. 1) and the remote storage device 110 (FIG. 1) is shown in FIG. 6. The procedure 182 generally follows the data flow described above with reference to FIG. 4.

The procedure 182 is initiated by the local host device 106 (FIG. 1) at step 183. At step 184, the local host device 106 quiesces, or suspends, any applications running on the local host device 106. At step 186, the local host device 106 "flushes," or sends, the unwritten data stored in the cache memory 172 (FIG. 4) to the local storage device 108 (FIG. 1) for the local volumes 128 and/or 130 for which the checkpoint state is being generated. At step 188, the local host device 106 generates the checkpoint information 116 (FIG. 1). At step 190, the local host device 106 sends the checkpoint information 116 in a message to the local storage device 108.

At step 192, the local storage device 108 updates its affected data volumes 124 (FIG. 2) with data from the host's cache memory 172 and synchronizes, or flushes, the unwritten data in the cache memory 174 (FIG. 4) for the local volumes 128 and/or 130 to the remote storage device 110 (FIG. 1). At step 194, the local storage device 108 forwards the checkpoint information 116 in the message to the remote storage device 110. Optionally, at this point, the local storage device 108 may delete its own copy of the checkpoint information 116 since the local storage device 108 may not need it for any other purpose.

At step 196, the remote storage device 110 updates the affected mirrored volumes 132 and 134 (FIG. 2) with the data received from the local storage device 108 and optionally clears any old data in the appropriate snapshots 148 and 150 (FIG. 2) of the snapshot repository 146 (FIG. 2). At step 198, the remote storage device 110 creates new snapshots 148 and 150 or sets a new marker in the existing snapshots in the snapshot repository 146 for the affected mirrored volumes 132 and 134 at the point indicated by the new checkpoint information 116 (FIG. 1). The procedure 182 ends at step 200.

A flow chart for an exemplary fail-over procedure 202 for the remote host device 109 and the remote storage device 110 to take over as the primary storage in the mirrored storage system 102 (FIG. 1) is shown in FIG. 7. The procedure 202 generally follows the data flow described above with reference to FIG. 5.

The procedure 202 is initiated by the business continuance client 115 (FIG. 1), or the remote host device 109 serving as the business continuance client, at step 204. At step 206, the business continuance client 115 detects a failure of the local host and/or storage devices 106 and/or 108 (FIG. 1), such as when the local storage device 108 fails to respond to an access request from one of the client device 104 (FIG. 1) after a predetermined period of time. The business continuance client 115 typically monitors the activity at both the local and remote locations to determine when a failure has occurred. The business continuance client 115 typically performs diagnostic tests on the local host device 106 to confirm that the local host and/or storage devices 106 and/or 108 has failed. At step 208, the business continuance client 115 signals the remote host device 109 to become the primary storage server for the affected data volumes 126 (FIG. 2) by sending the fail-over signal 176 (FIG. 5) to the remote host device 109. At step 210, the remote host device 109 sends the roll-back signal 177 (FIG. 5) to the remote storage device 110 (FIG. 1). At step 212, the remote storage device 110 generates the volume image 178 (FIG. 5) at the point indicated by the last checkpoint information 116 (FIG. 5) for the affected data volumes 126 (FIG. 2). At step 214, the remote storage device 110 sends the signal 179 (FIG. 5)

to the remote host device 109 indicating that the roll-back procedure has completed. Alternatively, as described above, the remote storage device 110 sends the signal 179 to the remote host device 109 before the roll-back procedure has completed, so the remote host device 109 does not have to wait for the remote storage device 110 to complete step 212 before proceeding with the next step (step 216). At step 216, the remote host device 109 sends the signal 180 (FIG. 5) to the business continuance client 115 indicating that the remote host and storage devices 109 and 110 are ready. At step 218, business continuance client 115 sends the signal 181 instructing the client devices 104 to restart the operations of the affected applications at the new coherent data state, using the remote host device 109 for primary data storage. The procedure 202 ends at step 224.

The present invention has the advantage that the client devices 104 (FIG. 1) can restart their applications, using the remote host and storage devices 109 and 110 (FIG. 1) for primary data storage, relatively quickly after the local host and/or storage device 106 and/or 108 (FIG. 1) fails to operate. A relatively short latency is experienced by the client devices 104 during the switch, or "fail-over," to the remote host and storage devices 109 and 110. The mirrored storage system 102 (FIG. 1) establishes and maintains stable, coherent checkpoint states at periodic intervals initiated by the local host device 106, so that the remote host device 109 and the remote storage device 110 can quickly and efficiently "roll back" to the most recent, or preferred, checkpoint state together without having to engage in complex back-and-forth communication to perform a file system check, recover the data and establish a coherent state, which consumes time and storage capacity.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method of storing and synchronizing data between a host device, a primary storage device, and a secondary storage device, wherein the host device storages data on the primary storage device on behalf of client devices, and the data stored on the primary storage device is mirrored to the secondary storage device, the method comprising the steps of:

initiating data synchronization from the host device to the primary storage device to make data stored on the primary storage device stable and consistent with data stored on the host device;

issuing a checkpoint message from the host device to the primary storage device to indicate that a storage state of the host device is stable and consistent at a predetermined checkpoint time indicated by the check point message;

performing data synchronization from the primary storage device to the secondary storage device to make data stored on the secondary storage device stable and consistent with the data stored on the primary storage device;

forwarding the checkpoint message from the primary storage device to the secondary storage device to indicate that a storage state of the primary storage device is at the checkpoint state; and generating an incremental snapshot of the mirrored data on the secondary storage device, the incremental snapshot including data and information describing the mirrored data at the predetermined checkpoint to preserve a storage state of the secondary storage device at the predetermined checkpoint.

2. A method as defined in claim 1 further comprising the steps of:

sending host data from the host device to the primary storage device;

updating the storage state of the primary storage device with the host data, the primary storage device storage state being consistent with the host device storage state;

sending storage data from the primary storage device to the secondary storage device; and updating the storage state of the secondary storage device with storage data, the secondary storage device storage state being consistent with the host device storage state.

3. A method as defined in claim 2, wherein the primary storage device is directly communicatively coupled to the secondary storage device.

4. A method as defined in claim 2, wherein the primary storage device communicates with the secondary storage device through a signal communication path that does not pass through the host device.

5. A method as defined in claim 1 further comprising the step of:

clearing a preexisting incremental snapshot before generating the incremental snapshot.

6. A method as defined in claim 1 further comprising the steps of:

adding the generated incremental snapshot to a preexisting incremental snapshot.

7. A method as defined in claim 1 further comprising the steps of:

sending host data from the host device to the primary storage device;

sending storage data from the primary storage device to the secondary storage device;

replacing preexisting mirrored data in the secondary storage device with the storage data; and transferring the preexisting mirrored data to the incremental snapshot in the secondary storage device to preserve the storage state of the secondary storage device at the checkpoint state.

8. A method as defined in claim 1 in combination with failing-over from utilization of the host device first aforesaid and the primary storage device to utilization of a second host device and the secondary storage device for storing data on behalf of the client devices, further comprising the steps of:

detecting a failure of at least one of the group consisting of the first host device and the primary storage device;

signaling the second host device and the secondary storage device that they are to be utilized for primary data storage;

assembling an image of the data stored on the secondary storage device from a most recent incremental snapshot at a most recent predetermined checkpoint indicated by a most recent checkpoint message;

informing the second host device that the data image is complete; and indicating that the second host device and the secondary storage device are ready to serve as primary data storage.

9. A method as defined in claim 1, wherein the checkpoint message is passed from the host device to the primary storage device and forwarded from the primary storage device to the secondary storage device, the checkpoint message being maintained in each of these devices.

10. A method of switching a client device from utilizing a first host device and a primary storage device to utilizing a second host device and a secondary storage device for primary data storage, upon failure of at least one of the group consisting of the first host device and the primary storage device, wherein data stored on the primary storage device is mirrored to the secondary storage device, and the data is synchronized between the first host device and the primary and secondary storage devices at a data synchronization checkpoint to establish a common stable state for the data in the first host device and the primary and secondary storage devices, comprising the steps of:

detecting a failure of at least one of the group consisting of the first host device and the primary storage device;

signaling the second host device that it is to be utilized for primary data storage services;

signaling the second storage device to restore data stored thereon to the common stable state;

assembling a data image of the mirrored data stored on the secondary storage device, the data image representing the mirrored data at the common stable state;

signaling the second host device that the data image is useable; and indicating the second host device and the secondary storage device are ready to serve as primary data storage.

11. A method as defined in claim 10, wherein the secondary storage device includes a data volume storage area and an old-data storage area, the first host device issues checkpoint synchronization information which is stored by the secondary storage device, the old-data storage area stores preexisting data that was stored in the data volume storage area at the common stable state and that was replaced in the data volume storage area by new data, further comprising the step of:

assembling the data image from the checkpoint synchronization information and the preexisting data stored in the old-data storage area.

12. A method as defined in claim 11 further comprising the step of:

restoring the secondary storage device to the common stable state by replacing the new data in the data volume storage area with the previously replaced preexisting data from the old-data storage area.

13. A method as defined in claim 11, wherein the first host device issues checkpoint synchronization information in a message.

14. A method as defined in claim 10, wherein a business continuance client signals the second host device that it is to be utilized for primary data storage devices.

15. A method as defined in claim 10, wherein a remote storage device signals that the data image is useable before completing a restore procedure.

16. A method as defined in claim 15, wherein the remote storage device signals a business continuance client that the remote host and a remote storage device are ready to begin servicing client devices.

17. A method mirrored storage computer system for servicing data storage requirements of software applications executing on client devices, comprising:

a host device operative to service the software applications requiring data storage, to store data externally, to issue external storage access requests and to initiate periodic external data synchronization at stable storage states referred to as data synchronization checkpoints wherein data stored on the host device is made coherent with externally stored data;

a primary storage device connected to the host device for external data storage and operative to store data received from the host device, to respond to the storage access requests from the host device, to make the data stored in the primary storage device coherent with the data stored on the host device at the data synchronization checkpoints, and to forward the data and the data synchronization checkpoints; and a secondary storage device connected to the primary storage device for secondary external data storage and operative to receive the forwarded data and the data synchronization checkpoints, to store the data, to make the data stored in the secondary device coherent with the data stored on the host device and the primary storage device at the data synchronization checkpoints, and to generate a snapshot of the stored data at the data synchronization checkpoints, the snapshot representing the stable storage state in the secondary storage device.

18. A mirrored storage system as defined in claim 17 further comprising:

a second host device, in addition to the host device first aforesaid, connected to the secondary storage device and operative to take over servicing the software applications requiring the data storage upon failure at least one of the group consisting of the first host device and the primary data storage device by utilizing the data stored on the secondary storage device and to externally store data on the secondary storage device by issuing external data access requests to the secondary storage device;

the secondary storage device further operative to store the data received from the second host device and to respond to the storage access requests from the second host device.

19. A mirrored storage system as defined in claim 18 wherein:

the second host device is further operative to send a restore signal to the secondary storage device instructing the secondary storage device to restore the data stored thereon to the stable storage state upon the failure of the at least one of the group consisting of the first host device and the primary data storage device; and the secondary storage device is further operative to receive the restore signal from the second host device, to restore the data stored on the secondary storage device to the stable storage state from the data synchronization checkpoint and the snapshot, and afterwards, to store data received from the second host device and respond to the storage access requests from the second host device.

20. A mirrored storage system as defined in claim 19, wherein the primary storage device does not generate a snapshot.

21. A mirrored storage system as defined in claim 19, wherein each of the primary and secondary host devices is one of the group consisting of computers and servers.

22. A mirrored storage system as defined in claim 21, wherein each of the primary and secondary storage systems is one of the group consisting of computers, storage servers, and storage array devices.

23. A mirrored storage system as defined in claim 19, wherein each of the primary and secondary storage systems store checkpoint information.

24. A method mirrored storage computer system for servicing data storage requirements of software applications executing on client devices, comprising:

a business continuance client;

at least one client that is not a business continuance client;

a first host device operative to service software applications requiring data storage, to store data externally, to issue external storage access requests and to initiate periodic external data synchronization at stable storage states referred to as data synchronization checkpoints wherein data stored on the first host device is made coherent with externally stored data;

a primary storage device connected to the first host device for external data storage and operative to store data received from the first host device, to respond to the storage access requests from the host device, to make the data stored in the primary storage device coherent with the data stored on the first host device at the data synchronization checkpoints, and to forward the data and the data synchronization checkpoints;

a second host device operative to assume functions of the first host device when the business continuance client detects a failure in at least one of the first host device and the primary storage device; and a secondary storage device connected to the primary storage device for secondary external data storage and operative to receive the forwarded data and the data synchronization checkpoints, to store the data, to make the data stored in the secondary device coherent with the data stored on the host device and the primary storage device at the data synchronization checkpoints, and to generate a snapshot of the stored data at the data synchronization checkpoints, the snapshot representing the stable storage state in the secondary storage device, wherein the at least one client that is not a business continuance client is provided with a signal by the business continuance client to restart applications in the event the second host device assumes the functions of the first host device, wherein data synchronization checkpoint information is issued in a message from the first host device to the primary storage device and the message is transmitted by the primary storage device to the secondary storage device.

* * * * *